Figure 1:
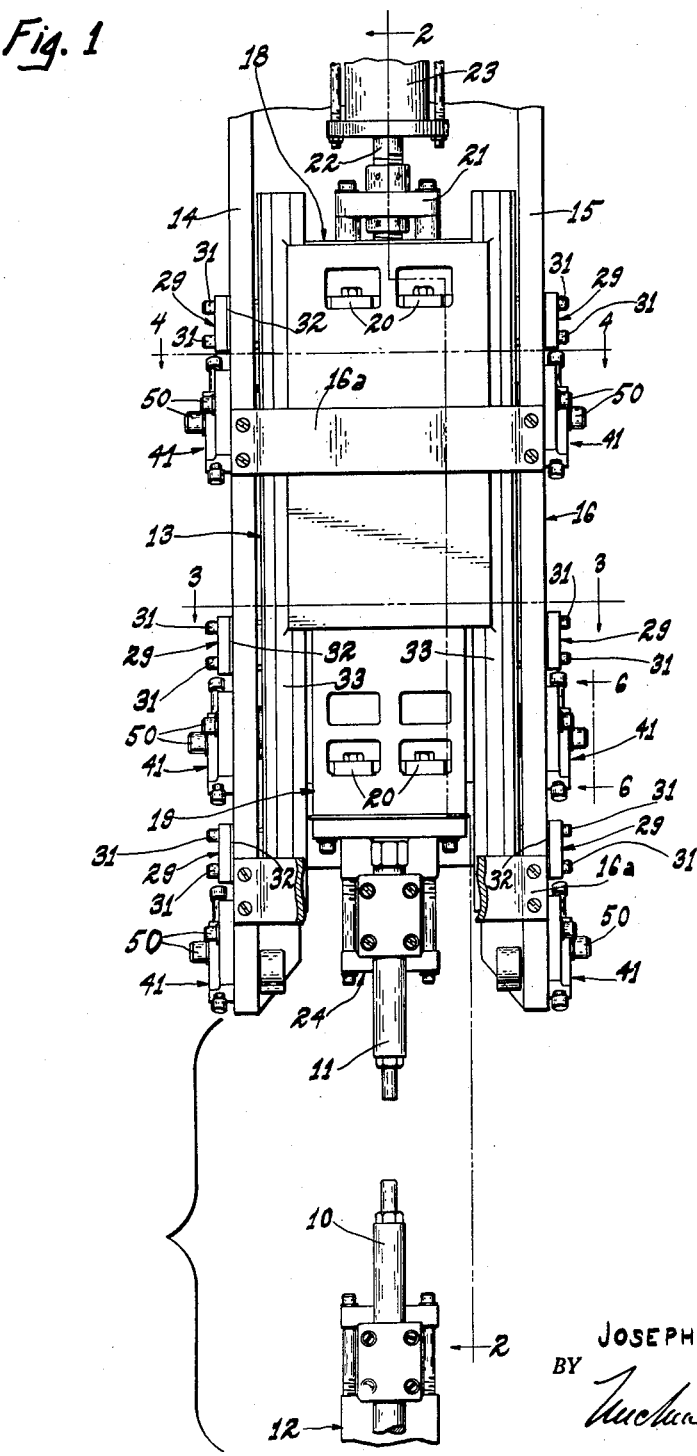

Jan. 5, 1960 J. R. HARRIS 2,919,957
MACHINE SLIDES
Filed July 6, 1956 5 Sheets-Sheet 3

INVENTOR.
JOSEPH R. HARRIS
BY
ATTORNEY

Jan. 5, 1960  J. R. HARRIS  2,919,957
MACHINE SLIDES
Filed July 6, 1956  5 Sheets-Sheet 4

INVENTOR.
JOSEPH R. HARRIS
BY
ATTORNEY

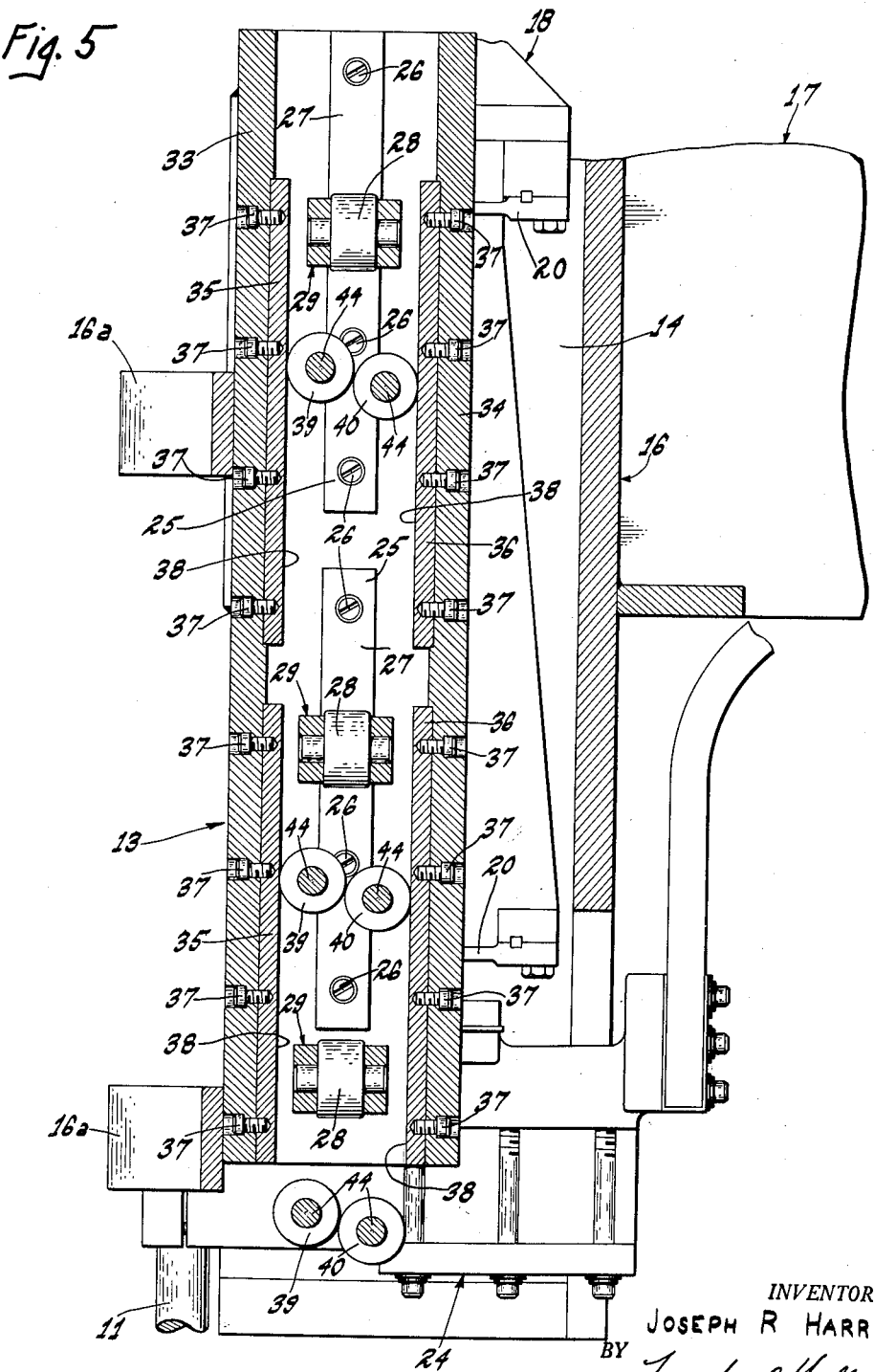

United States Patent Office 2,919,957
Patented Jan. 5, 1960

2,919,957

MACHINE SLIDES

Joseph R. Harris, Warren, Ohio, assignor to The Federal Machine & Welder Company Application July 6, 1956, Serial No. 596,278

11 Claims. (Cl. 308—6)

My invention relates to machine slides, more particularly to slides for welding machines and like apparatus, and the principal object of my invention is to provide new and improved apparatus of such character.

In apparatus such as presses, machine tools, welders and the like having a carriage member, or head, which is mounted for reciprocable movement, it is extremely important that such head be freely movable in the direction of reciprocation but without any free play in a transverse direction. This end has been accomplished in the past; however, it has usually involved expensive machining of matching parts and expensive hand fitting thereof. Further, subsequent adjustments to take up wear were difficult and time consuming and required the services of skilled mechanics.

The present invention provides a slide construction which requires a minimum of machining and which may be quickly set up for proper operation with a minimum of the fitting required with prior art constructions. Moreover, adjustments for wear may be easily made in but a few moments by a workman of ordinary skill and without shifting any of the parts out of alignment to thus require further adjustments before the apparatus can be returned to production. These and other advantages will readily become apparent from a study of the following description and from the drawings appended hereto.

Figure 2:
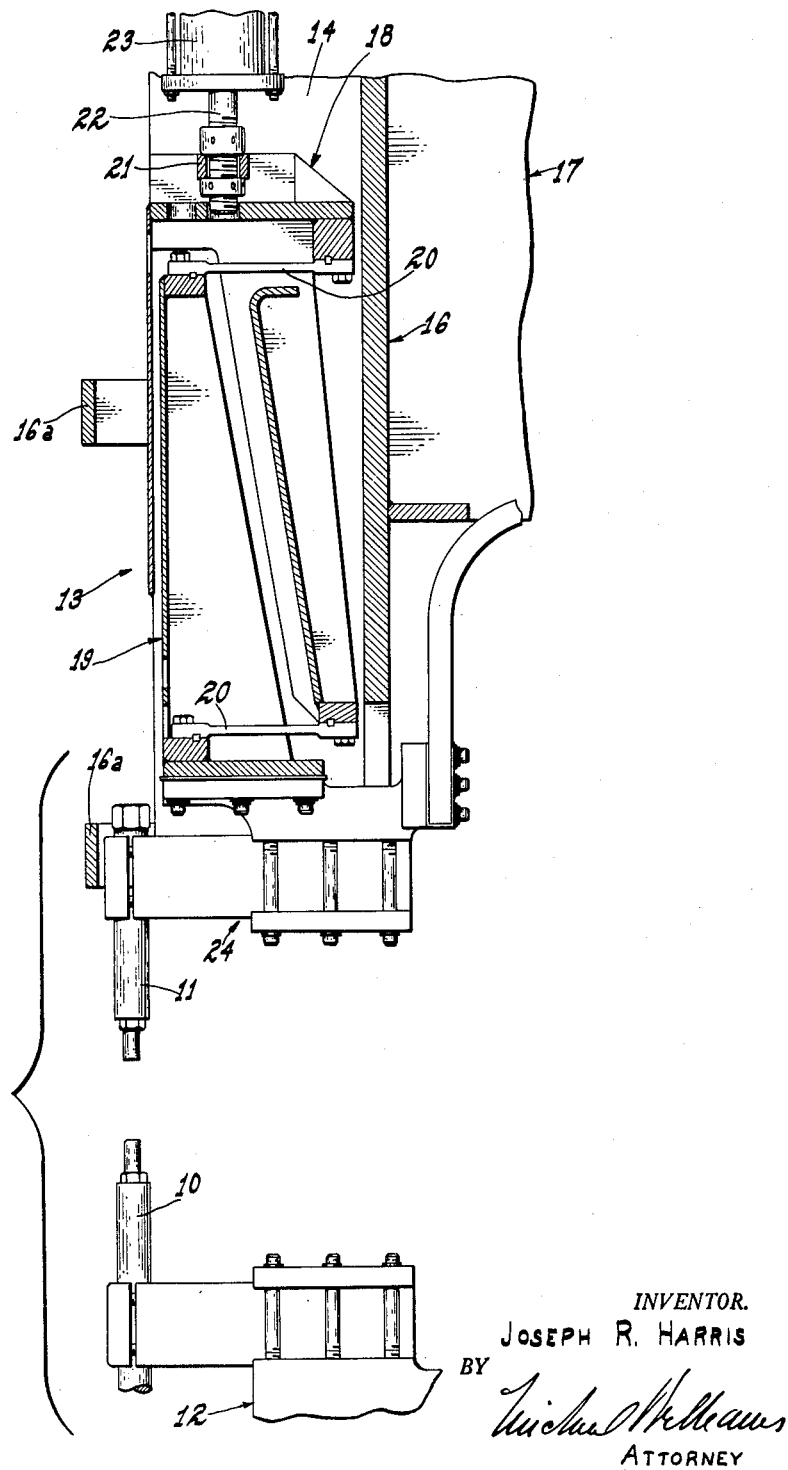
Figure 3:
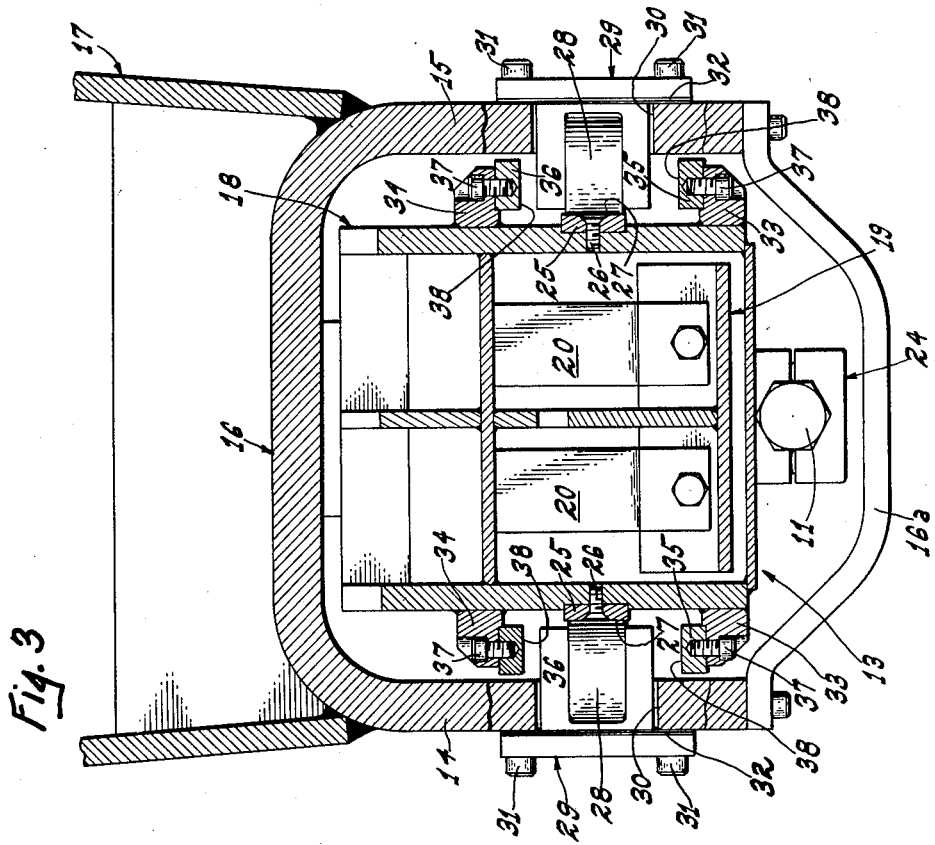
Figure 6:
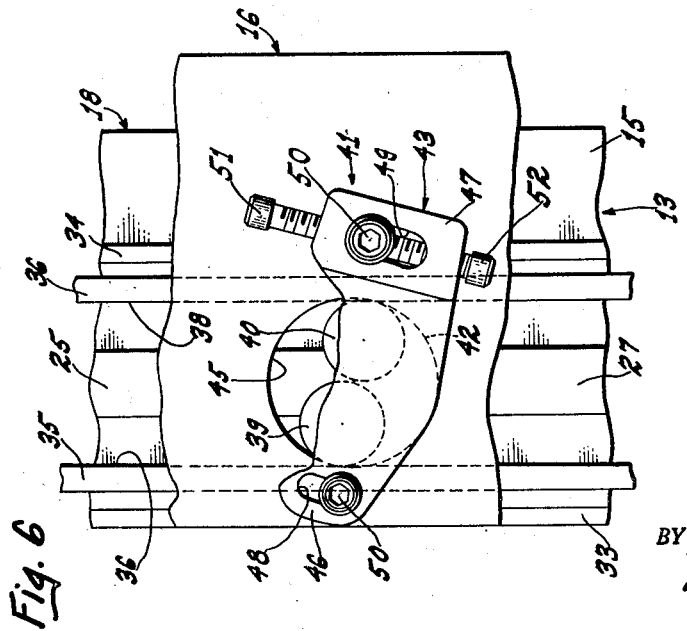
Figure 4:
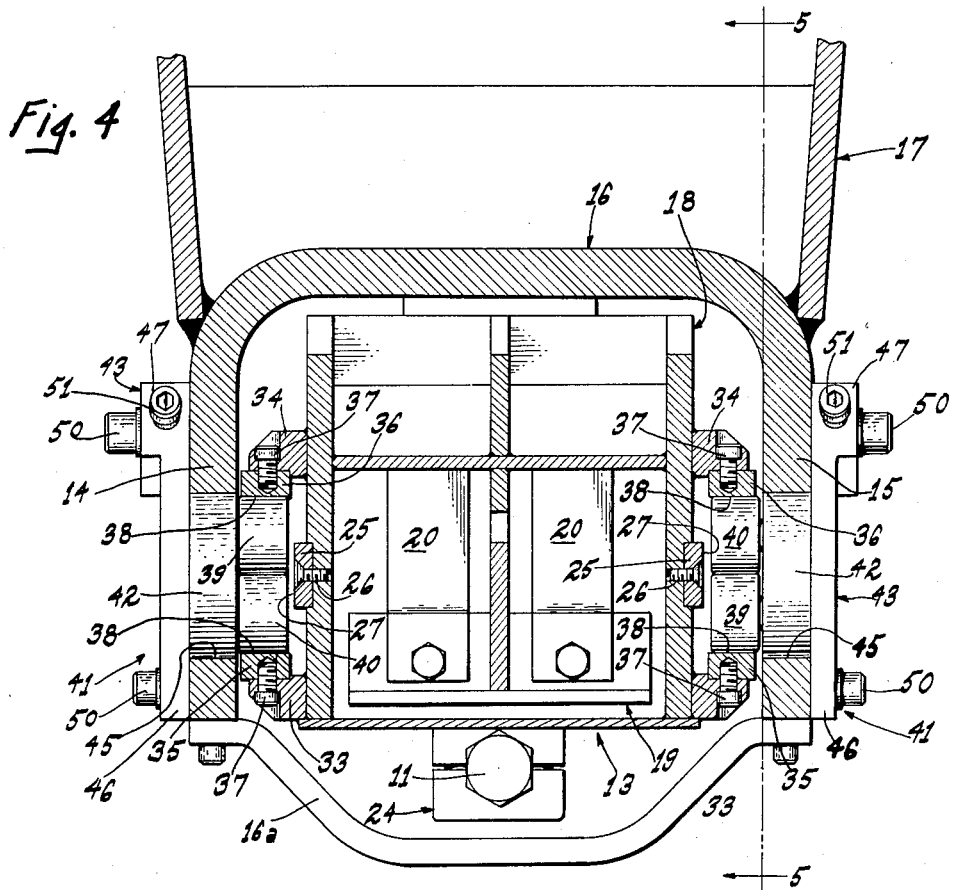
Figure 7:
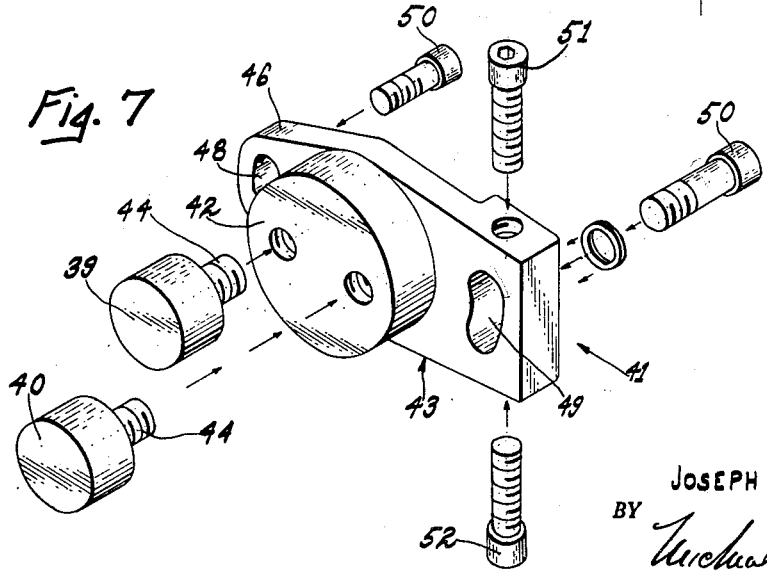

In the drawings accompanying this specification and forming a part of this application there is shown, for purpose of illustration, an embodiment which the invention may assume, and in these drawings:

Figure 1 is a fragmentary front elevational view of a spot welder constructed in accordance wtih the present invention, Figure 2 is a longitudinal sectional view generally corresponding to the line 2—2 of Figure 1, Figure 3 is an enlarged transverse sectional view generally corresponding to the line 3—3 of Figure 1, Figure 4 is an enlarged transverse sectional view generally corresponding to the line 4—4 of Figure 1, Figure 5 is a fragmentary sectional view, drawn to a slightly reduced scale, generally corresponding to the line 5—5 of Figure 4, Figure 6 is an enlarged fragmentary elevational view taken along line 6—6 of Figure 1, and Figure 7 is a further enlarged, exploded perspective view of certain details shown in Figure 6.

The present invention is hereinafter disclosed as being applied to spot welding apparatus; however, it will readily be apparent that the invention may be used to advantage with many other kinds of apparatus having a reciprocably mounted carriage member or head.

Referring to Figures 1 and 2 of the drawings, there is shown a spot welder having a fixed lower electrode 10 and a movable upper electrode 11 shiftable toward and away from the lower electrode. Lower electrode 10 is carried by a lower support arm 12 while upper electrode 11 is carried by a head 13 shiftably supported between the spaced legs 14, 15 (see Figures 3 and 4) of a channel-like housing member 16 which is structurally integral with an upper support arm 17. Although not shown in the drawings, respective lower and upper support arms 12 and 17 extend rearwardly of the welder (to the right as viewed in Figure 2) and are rigidly secured to, or are formed structurally integral with, a frame which rigidly ties the arms together in the usual manner. A pair of tie members 16a extend between and are secured to respective legs 14, 15 of the channel-like housing member 16 to reduce any tendency for the legs to spread apart under load.

As will later appear, head 13 is mounted for vertical reciprocation between the spaced legs 14, 15 of housing 16 so as to shift the attached upper electrode 11 therewith toward and away from lower electrode 10. In the present embodiment and as seen in Figures 2 and 3, it is preferable to form head 13 in two portions comprising an upper-outer portion 18 and a lower-inner portion 19 which are secured together by means of resilient bar members 20. Head portion 18 carries a bar 21 which is secured to the piston rod 22 of a suitable fluid motor 23 carried by housing 16 while head portion 19 carries a suitable bracket structure 24 in which upper electrode 11 is clamped.

From the foregoing it will be understood that as head 13 is shifted downwardly by the fluid motor 23 so as to clamp a work piece (not shown) between respective electrodes, head portions 18, 19 will move downwardly together until such downward movement of head portion 19 is arrested by engagement of the upper electrode with the work piece supported by the lower electrode. Downward movement of head portion 18 will continue, under the urging of the fluid motor, for a short distance so as to deflect the resilient bar members 20. Suitable well-known switch means (not shown) will be carried by head 13 to close an electrical circuit which causes a momentary surge of welding current to flow between the electrodes when a given amount of relative movement, as above described, has taken place between the respective head portions 18, 19. As the work piece softens under the flow of welding current, resilient bar members 20 will cause head portion 19 and upper electrode 11 to immediately follow up the softened metal so as to maintain pressure on the weld while it cools. Fluid motor 23 will then be actuated to raise head 13 and separate the electrodes to permit removal of the welded work.

The novel arrangement for mounting head 13 for movement relative to housing member 16 preferably comprises a plurality of slide surfaces carried by the head which extend in the direction of movement thereof and which are engaged by suitable rollers carried by the housing.

Considering first the means for restricting side to side movement of the head, that is, movement toward or away from respective legs 14, 15 of housing 16, it will be seen in Figures 3 and 5 that respective sides of the upper-outer head portion 18 carry replaceable, vertically extending wear strips 25. Wear strips 25 presently fit in suitably machined grooves in head portion 18 and are secured to such head portion by means of screws 26.

The wear strips 25 on respective sides of the head portion provide respective opposed surfaces 27 which engage rollers 28 secured to the housing 16. Rollers 28 are arranged in longitudinally spaced-apart relation relative to the housing and in the present embodiment, there are three rollers 28 on each side of the housing engaged with the respective adjoining wear strips 25 carried by head portion 18.

Each roller is rotatably carried by a bracket 29 which projects through an aperture 30 formed in respective legs 14, 15 of housing 16. Screws 31 secure each bracket to the housing and shims 32 are interposed between each bracket and the adjoining surface of the housing to provide for adjusting respective rolls 28 on each side of head portion 18 toward or away from each other to closely engage respective wear strips 25.

Referring now to the means employed to restrict front to rear movement of head 13, each side of head portion 18 is provided with vertically extending spaced-apart lugs 33, 34 which are machined to receive respective wear strips 35, 36 which are readily replaceable. The wear strips 35, 36 are secured to respective adjoining lugs 33, 34 by means of screws 37, adjoining wear strips on each side of the head portion providing facing, spaced-apart surfaces 38 in side-by-side relation for a purpose to be seen. Guide means are provided for engagement with respective surfaces 38 and in the present embodiment, three pair of rollers each comprising a roller 39 and a roller 40 are positioned on each side of head portion 13 and are adapted to engage surfaces 38 of respective adjoining wear strips 35, 36. Each pair of the rollers 39, 40 is carried by a respective bracket, or carrier 41. Since carriers 41 and their associated parts are preferably identical, a description of one will suffice for all.

Each carrier 41 preferably comprises a circular hub portion 42 and a head portion 43 (see especially Figures 4 and 7). The stub shaft 44 of each roller 39, 40 is adapted to be anchored in the hub 42 of the carrier so that the rollers are in side-by-side relation, the rotational axes of rollers 39, 40 being on diametrically opposite sides of the axis of hub 42 and each being spaced an equal distance from the axis of the hub for a purpose to be seen.

Apertures 45 (see Figure 4) are formed in legs 14, 15 of housing 16 for closely receiving hubs 42 of respective carriers and within which such hubs are rotatable. In order to facilitate manufacture, apertures 45 in respective housing legs 14, 15 are preferably arranged in pairs with the respective apertures of each pair in alignment to permit each pair of apertures to be line bored. As will later appear, so long as the apertures 45 on each side of the housing are properly machined in vertical alignment, no hand fitting will be required in assembling the head for proper operation with respect to the housing. As illustrated, each aperture 45 is sufficiently large to pass rollers 39 and 40 when they are assembled with their carriers so as to facilitate assembly and disassembly of the carriers with the housing.

The flange 43 of each carrier 41 is provided with diametrically opposed, radially extending ears 46 and 47 having respective arcuate slots 48 and 49 for passing mounting screws 50 which thread into housing 16 to hold the carrier in place. Ear 47 also has threaded apertures for receiving adjusting screws 51, 52 which abut the adjoining mounting bolt 50 for a purpose to be disclosed.

As best seen in Figure 6, the spacing between surfaces 38 of the respective adjoining wear strips 35, 36 is less than the distance across the peripheries of rollers 39, 40. Accordingly, when the rollers are engaged with respective wear strips, carrier 41 will be tilted as indicated. Clearly, if it is desired to urge the rollers into closer engagement with the wear strips, such as when re-adjustment is required because of wear, mounting screws 50 will be loosened and adjusting screws 51, 52 adjusted to rotate carrier 41 in a counter-clockwise direction to thus simultaneously urge rollers 39, 40 into engagement with the respective wear strips. Mounting screws 50 will then be tightened to maintain the carrier in adjusted position. It is to be understood that the carriers on the opposite side of housing 16 from that shown in Figure 6 will be adjusted in the same manner except that these carriers will be rotated in a clockwise direction to urge the rollers carried thereby into closer engagement with the adjoining wear strips.

As best seen in Figure 2, when electrodes 10, 11 are positioned to the front of head 13 to gain maximum working space between the electrodes and the frame (not shown) which connects lower and upper arms 12, 17 together, an eccentric load is placed upon the head during welding operations since the load is not centered between the facing guide surfaces 38 of the wear strips 35, 36. This eccentric load tends to rotate the head in a clockwise direction (as viewed in Figures 2 and 6, of course). This rotation is resisted not only because the pairs of rollers supported by carriers 41 are spaced longitudinally of the direction of movement of the head, but is also resisted by the individual sets of rollers carried by each carrier. The manner in which the individual sets of rollers resist such rotation will become evident from a study of Figure 6.

As illustrated in Figure 6, a force which tends to rotate head 13 about the axis of any one carrier 41 will be resisted by rollers 39, 40 of such carrier since such rotation will tend to wedge the wear strips more tightly against the rollers. Thus, the resultant binding action tends to resist rotation of the head and this, together with the above mentioned longitudinal spacing of the rollers, results in the head being supported with great rigidity.

As previously mentioned, there are three rollers 28 and three sets of rollers 39, 40 on each side of head 13 in the presently disclosed embodiment. In order to attain maximum rigidity of the head during the welding operation, that is, when the head is in its lowermost position, the lowermost rollers 28 and the lowermost rollers 39, 40 are positioned as low as possible. Accordingly, when the head is elevated as shown in Figure 5, such lower rollers are out of engagement with the head. However, as the head moves downwardly to working position, such rollers engage their respective wear strip surfaces and thus contribute to support of the head.

It is an important feature of the present invention that since rollers 39 and 40 are on diametrically opposite sides of the axis of hub 42, facing surfaces 38 of the wear strips 35, 36 will be spaced equally on opposite sides of the axis of the hub when the rollers are engaged with such surfaces. Accordingly, since the hub receiving apertures 45 are in vertical alignment, adjustment of any of the carriers 41 will simultaneously move its rollers 39, 40 into proper engagement with respective wear strips 35, 36 without shifting the vertical axis of the head. Since each roller 39, 40 is simultaneously moved into engagement with respective wear strips, each roller will carry its proportionate share of the load.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A machine slide construction comprising a pair of relatively movable members, a pair of spaced-apart surfaces provided by one of said members and extending in side-by-side relation in the direction of member movement, a carrier carried by the other of said members and swingable about an axis which extends transversely of the direction of member movement and which is spaced equidistant between said surfaces, and a pair of rollers carried by said carrier for engagement with respective surfaces, said rollers being rotatable with said carrier about said axis and being simultaneously movable toward and away from respective surfaces upon rotation of said carrier.

2. A machine slide construction which is adjustable for wear and the like comprising a pair of relatively movable members, a pair of spaced-apart surfaces provided by one of said members and extending in side-by-side relation in the direction of member movement, a pair of rollers engageable with respective surfaces for guiding member movement, and a carrier carried by the other of said members and in turn carrying said rollers, said carrier being rotatable about an axis which extends transversely of the direction of member movement, said rollers being adjustable toward and away from respective surfaces upon rotation of said carrier about said axis and the latter being spaced equidistant between said surfaces to provide for adjustment of said rollers without effecting relative shifting of said members in a direction transverse to member movement.

3. A machine slide construction which is adjustable for wear and the like comprising a pair of relatively movable members, a pair of spaced-apart, oppositely facing surfaces provided by one of said members and extending in side-by-side relation in the direction of member movement, a pair of rollers engageable with respective surfaces for guiding member movement, and a carrier carried by the other of said members and in turn carrying said rollers, said carrier being rotatable about an axis which extends transversely of the direction of member movement and said rollers being disposed on opposite sides of said axis and spaced equidistant therefrom, said rollers being adjustable toward and away from respective surfaces upon rotation of said carrier about said axis and the latter being spaced equidistant between said surfaces to provide for adjustment of said rollers without effecting relative shifting of said members in a direction transverse to member movement.

4. A machine slide construction which is adjustable for wear and the like comprising a pair of relatively movable members, a pair of spaced-apart, oppositely facing surfaces provided by one of said members and extending in side-by-side relation in the direction of member movement, two pair of rollers for guiding member movement, said roller pairs being spaced from each other in the direction of member movement and respective rollers of each pair being engageable with respective surfaces, and a pair of carriers carried by the other of said members and in turn carrying respective roller pairs, said carriers being rotatable about respective axes which extend transversely of the direction of member movement and the rollers of each pair being disposed on opposite sides of respective axes and spaced equidistant therefrom, the rollers of each pair being adjustable toward and away from respective surfaces upon rotation of respective carriers about respective axes and the latter being spaced equidistant between said surfaces to provide for adjustment of said rollers without effecting relative shifting of said members in a direction transverse to member movement.

5. A machine slide construction which is adjustable for wear and the like comprising a pair of relatively movable members, spaced-apart, oppositely facing surfaces provided by one of said members and disposed in pairs on opposite sides thereof, respective surfaces of each pair extending in side-by-side relation in the direction of member movement, two pair of rollers disposed on each of said opposite sides of said one member for guiding member movement, the roller pairs on each side of said one member being spaced from each other in the direction of member movement and respective rollers of each pair being engageable with respective surfaces on the same side of said one member, and carrier means carried by the other of said members and in turn carrying respective roller pairs, said carrier means being rotatable about respective axes which extend transversely of the direction of member movement and the rollers of each pair being disposed on opposite sides of respective axes and spaced equidistant therefrom, the rollers of each pair being adjustable toward and away from respective surfaces upon rotation of respective carrier means about respective axes and the latter being spaced equidistant between said surfaces to provide for adjustment of said rollers without effecting relative shifting of said members in a direction transverse to member movement.

6. A machine slide construction comprising a pair of relatively movable members, a pair of spaced-apart surfaces provided by one of said members and extending in side-by-side relation in the direction of member movement, guide means shiftably carried by the other of said members for engagement with respective surfaces, and means for simultaneously shifting said guide means toward and away from respective surfaces to provide for adjustment therebetween without effecting relative shifting of said members in a direction transverse to member movement.

7. A machine slide construction comprising a pair of relatively movable members, a pair of spaced-apart surfaces provided by one of said members and extending in side-by-side relation in the direction of member movement, and guide means provided by the other of said members engageable with respective surfaces and simultaneously shiftable toward and away from respective surfaces about an axis which extends transversely of member movement to provide for adjustment between said guide means and said surfaces without effecting relative shifting of said members in a direction transverse to member movement.

8. A machine slide construction comprising a pair of relatively movable members, a pair of spaced-apart surfaces provided by one of said members and extending in side-by-side relation in the direction of member movement, carrier means shiftably carried by the other of said members, and a pair of guide means carried by said carrier means and engageable with respective surfaces, said guide means being simultaneously movable toward and away from respective surfaces upon shifting of said carrier means to provide for adjustment between said guide means and said surfaces without effecting relative shifting of said members in a direction transverse to member movement.

9. A machine slide construction comprising a pair of relatively movable members, a pair of spaced-apart surfaces provided by one of said members and extending in side-by-side relation in the direction of member movement, carrier means carried by the other of said members and swingable about an axis which extends transversely of the direction of member movement, and guide means carried by said carrier means and engageable with respective surfaces, said guide means being simultaneously movable toward and away from respective surfaces upon shifting of said carrier means to provide for adjustment between said guide means and said surfaces without effecting relative shifting of said members in a direction transverse to member movement.

10. A machine slide construction which is adjustable for wear and the like comprising a pair of relatively movable members, a pair of spaced-apart, oppositely facing surfaces provided by one of said members and extending in side-by-side relation in the direction of member movement, and two pair of rollers provided by the other of said members for guiding member movement and said roller pairs being spaced from each other in the direction of member movement and respective rollers of each pair being engageable with respective surfaces, the rollers of each pair being simultaneously movable toward and away from respective surfaces to provide for adjustment therebetween without effecting relative shifting of said members in a direction transverse to member movement.

11. A machine slide construction which is adjustable for wear and the like comprising a pair of relatively movable members, a pair of spaced-apart, oppositely facing surfaces provided by one of said members and extending in side-by-side relation in the direction of member movement, and two pair of rollers provided by the other of said members for guiding member movement and said roller pairs being spaced from each other in the direction of member movement and respective rollers of each pair being engageable with respective surfaces, the rollers of each pair being spaced equidistant from and diametrically of an axis which extends transversely of member movement and each pair of rollers being shiftable about its axis to simultaneously move the rollers of such pair toward and away from respective surfaces to provide adjustment between such rollers and surfaces without effecting relative shifting of said members in a direction transverse to member movement.

References Cited in the file of this patent

UNITED STATES PATENTS

| | | |
|---|---|---|
| 291,720 | Griscom | Jan. 8, 1884 |
| 1,926,828 | Van Berkel | Sept. 12, 1933 |
| 2,622,939 | Ljunggren | Dec. 23, 1952 |

FOREIGN PATENTS

| | | |
|---|---|---|
| 11,740 | Great Britain | 1847 |